United States Patent [19]

Sakura

[11] 4,116,071

[45] Sep. 26, 1978

[54] DEVICE FOR MEASURING QUANTITY OF FLOWABLE MATERIALS

[76] Inventor: Gerald Paul Sakura, 1 Earl Cottages, London, SE1, England

[21] Appl. No.: 746,202

[22] Filed: Dec. 1, 1976

[30] Foreign Application Priority Data

Dec. 1, 1975 [GB] United Kingdom ............... 49274/75

[51] Int. Cl.² ........................................... G01F 19/00
[52] U.S. Cl. ....................................... 73/429; 220/93
[58] Field of Search ................... 73/429, 426; 220/93; 222/306, 308

[56] References Cited

U.S. PATENT DOCUMENTS

| 551,710 | 12/1895 | Beardsley | 73/429 |
| 1,445,789 | 2/1923 | Mojonnier | 73/429 |
| 2,162,404 | 6/1939 | Kerr | 222/440 |

FOREIGN PATENT DOCUMENTS 33,471  5/1905  Switzerland ............... 73/429

Primary Examiner—S. Clement Swisher
Assistant Examiner—Denis E. Corr
Attorney, Agent, or Firm—Toren, McGeady and Stanger

[57] ABSTRACT

For measuring flowable materials, e.g. grain, flour, etc. which is sold loose in small quantities, the invention proposes a measuring container which has a progressively movable wall. Thus, its volume can be pre-adjusted for a particular material so that when full exactly to the brim, the contents weigh an exact amount, e.g. 1 lb.

6 Claims, 4 Drawing Figures

DEVICE FOR MEASURING QUANTITY OF FLOWABLE MATERIALS

The present invention concerns a device for measuring flowable materials.

The sale and packaging of flowable materials for example rice and grain foodstuffs for humans or pets often entails the taking of a quantity of the material from a bulk container, such as a sack; followed by the weighing out of the required amount, which may for example be 1 lb., and subsequent packaging. This sequence is expensive in terms of the retailer's time and equipment.

The present invention seeks to provide a measuring device which is easier and quicker to use, and which speeds up or eliminates some of the above steps.

According to the invention, there is provided a measuring device for flowable materials comprising a container having a chamber with an open top, which enables charging and/or discharging of a material into said chamber, and a member including a wall to said chamber which is progressively movable to vary the volume of the chamber. In a preferred embodiment the container has a screw-threaded body portion open at both ends, one end being closed by a member which forms or carries said wall and has a complementary screw-thread.

An embodiment of the invention will now be described in greater detail by way of example with the aid of the accompanying drawings in which.

Figure 1:
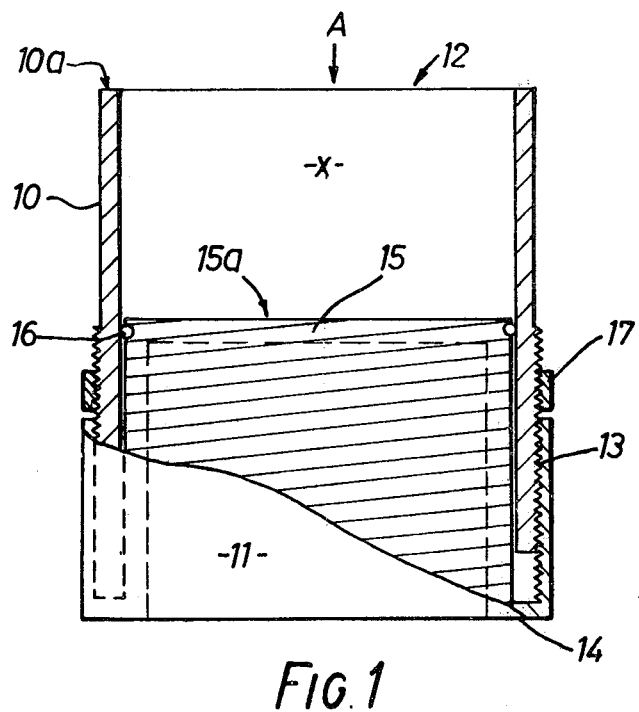
FIG. 1 shows a part-sectional side view first embodiment of a device.
Figure 2:
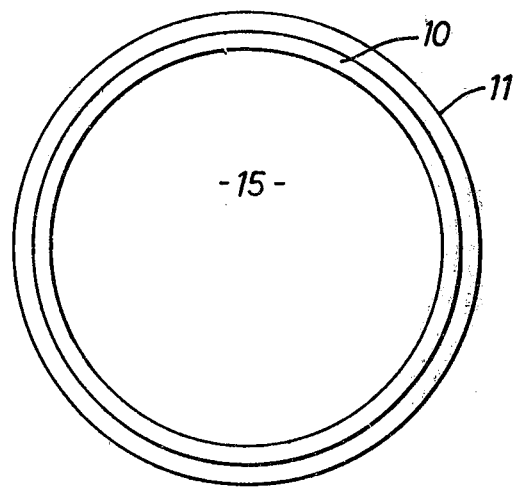
FIG. 2 shows a plan view of the device of FIG. 1, seen from the direction of arrow A in FIG. 1.

In the simple version of the device shown in FIG. 1, a hollow tube-like body 10 is threaded externally at one end to receive a cap 11. The body 10 is open at 12. Cap 11 is internally threaded as shown at 13. Extending from base 14 of cap 11 is a plug-like member 15 which is a snug fit within body 10. The space between the surface 15a of member 15 and the rim 10a of body 10 is designated —x—. The member 15 is preferably hollow, and preferably has a gasket or seal 16 around its outer surface near the top.

Since member 15 moves with the cap 11, it will be apparent that adjustment of cap 11 raises or lowers member 15 to increase or decrease space —x—. The cap 11 is adjusted on body 10 by screwing or unscrewing it until the space —x— exactly holds a required quantity of material as pre-determined by weighing.

When adjustment is completed, cap 11 may be locked in position by any suitable means, for example by a locking ring 17 capable of being screwed independently on the threaded portion of body 10.

In use after calibration, the device is plunged into a bulk supply of material until space —x— is full, any surplus heaped above rim 10a being smoothed off until the surface of the material is flush with rim 10a. The material may then be discharged into a container for use, or onto a scale for checking the weight if the law requires it. Even then, the weight is bound to be correct.

Although described herein with reference to a body of circular cross-section, the major part of body 10 may be of any suitable cross-section provided that when it is desired to employ a screw-on cap 11, that portion of body 10 which receives the cap 11 shall be substantially of circular cross-section.

In a further embodiment (not illustrated) the body-member 10 is adapted to receive the cap 11 as a push-fit, and in this case the body and cap may be of any suitable cross-section which matches their interface. In this embodiment the selected position of the cap 11 upon body 10 may be lockable, for example by means of a locking screw capable of piercing the cap to enter the body in a securable manner.

In a yet further embodiment, the volume variation may be achieved by the projection or retraction of a stout peg through a wall of the container.

Figure 3:
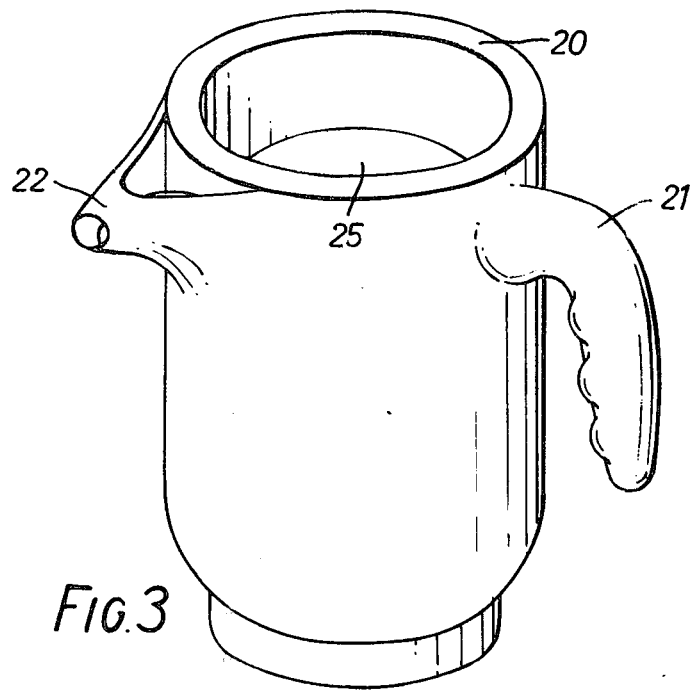
FIG. 3 shows a second embodiment in perspective view.
Figure 4:
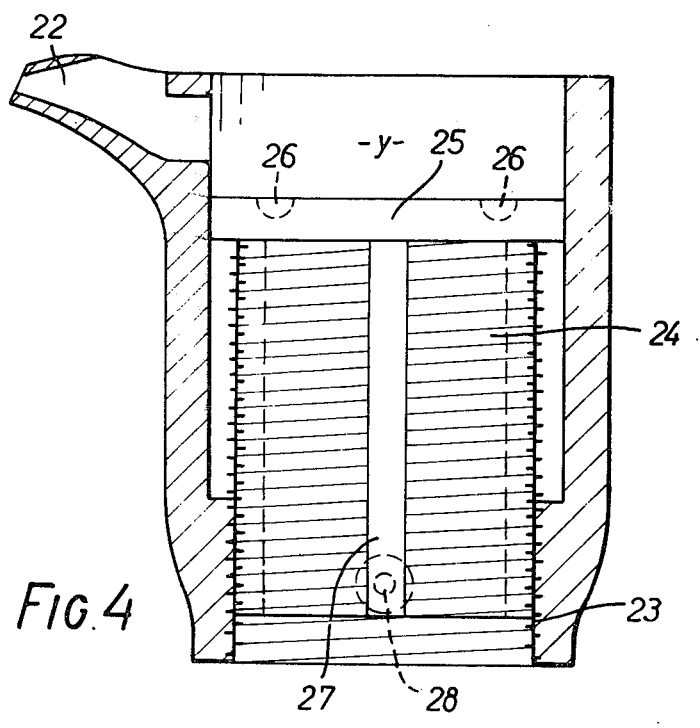
FIG. 4 shows a section through the device of FIG. 3.

FIGS. 3 and 4 show a more developed version of a measuring device. This body 20 is designed more like a jug, with a handle 21 and a spout 22. In this case, the body is threaded internally at 23, where it has a slightly reduced internal diameter. An externally threaded hollow plug 24 with a top plate 25 which fills the cross-section of the body 20 is inserted from the top so that the plate 25 forms the bottom of an open-topped cavity —y—.

The top of the plate 25 may have depression 26 in it to act as finger grips to enable rotation of the plug. Alternatively, the inside underneath of the plug may have projections for the same purpose.

The rim of the plate 25 may include a seal ring to prevent powder seeping downwards; the external threading on the plug 24 has a groove 27 which allows any trapped dust or particles to escape and prevents jamming of the plug 24 in the body 20.

The method of use of this version is identical with that of the device of FIG. 1. An additional locking means may be provided to maintain the position of the plug in the body. In FIG. 4, a bolt 28 with a large knurled head is shown in dotted lines in a position projecting through the wall of the body 20 from outside and engaging in the groove 27 to prevent rotation of the plug 24 once set.

In all cases, the device may be made in any suitable material, in particular plastics or metal.

It will be understood that the above description of the present invention is susceptible to various modifications, changes and adaptions.

What is claimed is:

1. A measuring device having a chamber in a container with an open top which enables charging and/or discharging of a material into said chamber, said container comprises a cylindrical tube-like body having a central axis, and a member forming a wall of said chamber extending transversely of the central axis of said tube-like body, said wall being progressively movable in the direction of said central axis relative to said tube-like body for varying the volume of said chamber, said tube-like body having a first annular surface and said wall having a second annular surface and said first and second surfaces each being smooth and defining the variable volume interior of said chamber, said tube-like body having a third annular surface having a diameter different from said first annular surface, said member having a fourth annular surface in sliding engagement with said third annular surface and being displaceable relative to said third annular surface for varying the position of said wall within said chamber, screw-threaded connecting means on the fourth surface of said member and the third surface of said tube-like body providing the sliding engagement thereof, said third annular surface being an internal surface, and said member comprises a cylindrical plug for said tube-like body and said fourth annular surface being an external surface on said plug.

2. A measuring device as claimed in claim 1 including locking means which lock the movable member and wall in a pre-determined position relative to said tube-like member.

3. A measuring device as claimed in claim 2 wherein said locking means comprises a locking bolt projecting through said tube-like body into contact with said plug.

4. A measuring device as claimed in claim 1 wherein the wall of said cylindrical plug has formations which are finger-engageable to enable rotation of the member.

5. A measuring device as claimed in claim 1 wherein said first surface having a larger diameter than said third surface and said wall of said plug having a circumferential periphery having a diameter corresponding to the diameter of said first surface and having a larger diameter than said fourth surface, said fourth surface being in threaded engagement with said third surface.

6. A measuring device having a chamber in a container with an open top which enables charging and/or discharging of a material into said chamber, said container comprises a cylindrical tube-like body having a central axis, and a member forming a wall of said chamber extending transversely of the central axis of said tube-like body, said wall being progressively movable in the direction of said central axis relative to said tube-like body for varying the volume of said chamber, said tube-like body having a first annular surface and said wall having a second annular surface and said first and second surfaces each being smooth and defining the variable volume interior of said chamber, said tube-like body having a third annular surface having a diameter different from said first annular surface, said member having a fourth annular surface in sliding engagement with said third annular surface and being displaceable relative to said third annular surface for varying the position of said wall within said chamber, screw-threaded connecting means on the fourth surface of said member and the third surface of said tube-like body providing the sliding engagement thereof, and a groove extending along said screw-threaded connecting means to permit release of material which becomes trapped in said means.

* * * * *